Sept. 25, 1928.
L. D. SOUBIER
1,685,143
APPARATUS FOR DELIVERING CHARGES OF MOLTEN GLASS
Filed Jan. 4, 1924   3 Sheets-Sheet 1
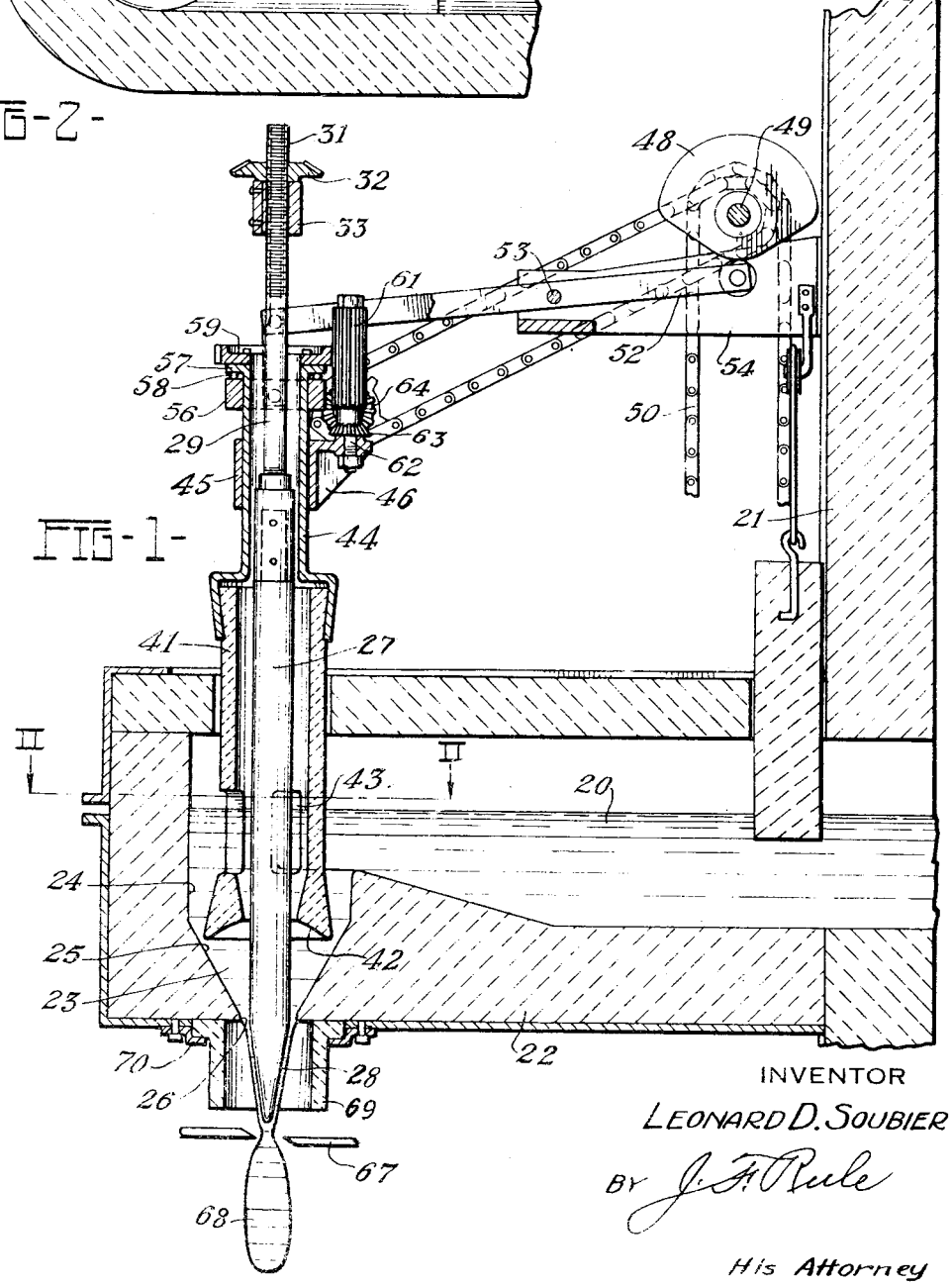
INVENTOR
LEONARD D. SOUBIER
BY J.F. Rule
His Attorney

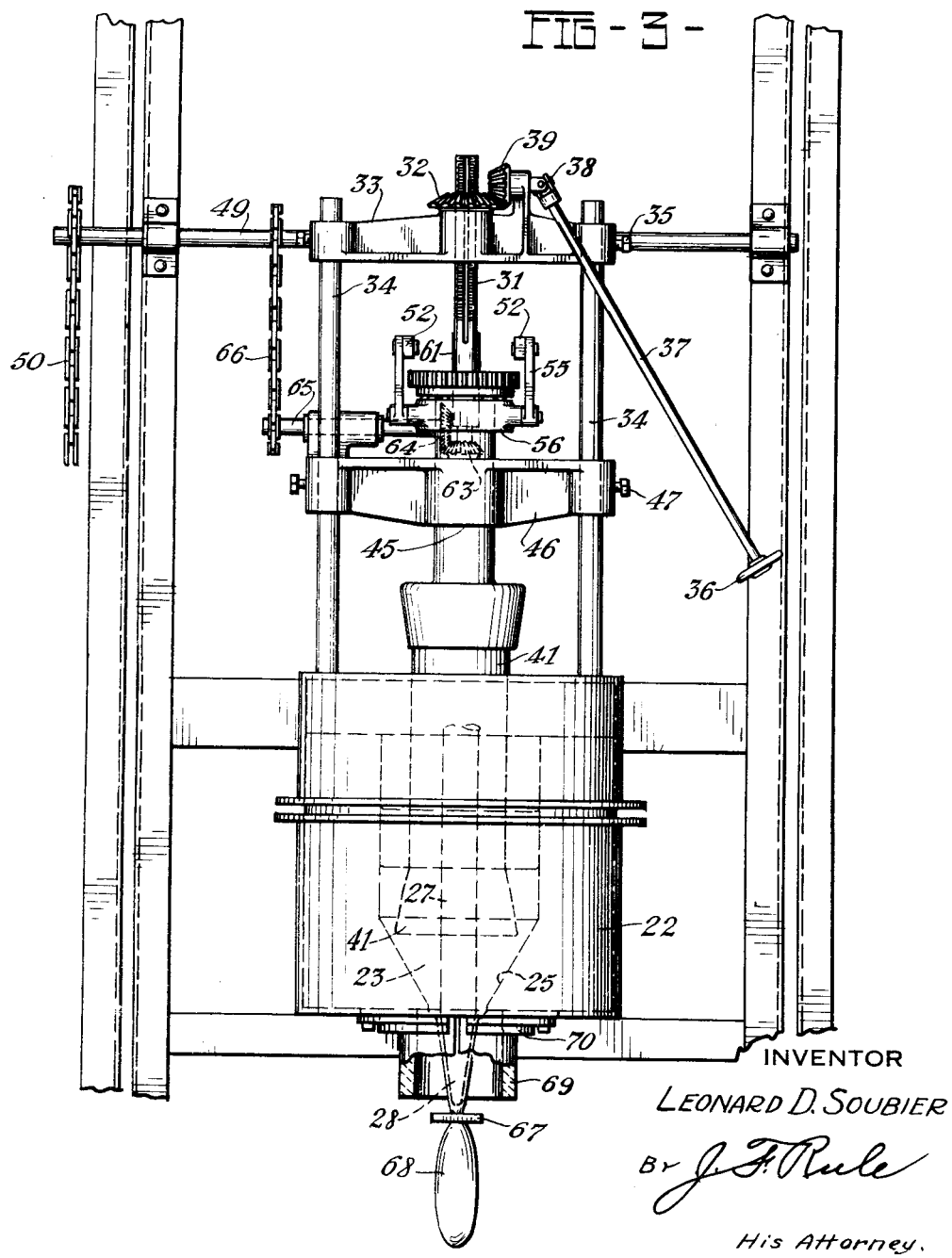

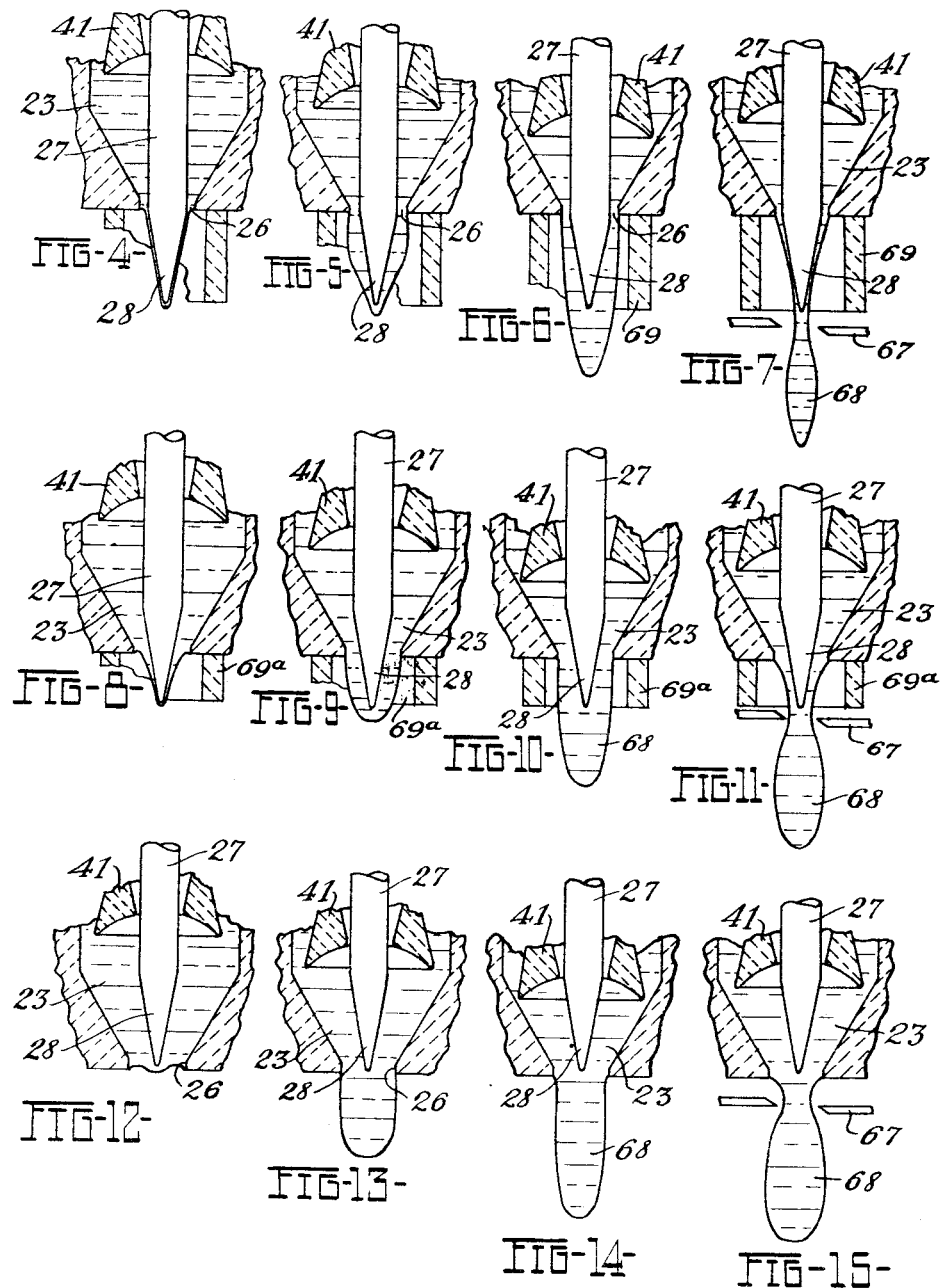

Patented Sept. 25, 1928.

1,685,143

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR DELIVERING CHARGES OF MOLTEN GLASS.

Application filed January 4, 1924. Serial No. 684,296.

My invention relates to glass feeding apparatus for producing mold charges of molten glass and more particularly to that type of glass feeders in which the glass is discharged through an outlet in the bottom of a container, the discharge being regulated and controlled by a regulating member periodically reciprocated vertically in the glass over the discharge outlet.
In feeders of this type at present in use, the quantity of glass discharged during each reciprocation of the regulator is determined to a considerable extent by the length of stroke of the regulator and may be varied to a certain extent by varying the length of stroke. The issuing glass is supported in the form of a suspended gob depending from the outlet prior to severance, the shape of the gob being controlled to an extent by the shape of the lower end of the regulator.

An object of the present invention is to provide a practical means for controlling the size and shape of the gob without varying the length of stroke of the regulator.
A feature of the invention consists in the provision of novel means for adjusting the effective area of the outlet opening, thereby regulating the rate at which the glass is permitted to issue and thus controlling the volume of the gob or charge of glass.

In its preferred form, the invention comprises a container for the glass having an outlet in its bottom, a stationary core projecting downward into the glass over the opening and having its lower end tapered, means to adjust the core up and down to thereby adjust the area of the outlet, a regulating member in the form of a sleeve or hollow plunger surrounding the core, and means to periodically reciprocate the regulator for controlling the discharge of glass.

Other features of the invention will appear more fully hereinafter.

In the accompanying drawings:
Figure 1 is a sectional side elevation of a feeder constructed in accordance with my invention.

Figure 2 is a section at the line II—II on Figure 1.

Figure 3 is a front elevation of the apparatus.

Figures 4 to 15 inclusive are diagrammatic views showing several adjustments of the core and illustrating successive steps in the cycle of operations for each of such adjustments. Figures 4 to 7 inclusive show the successive steps in the formation of a gob or charge of glass when the core is adjusted for forming a small gob. Figures 8 to 11 are similar views, but with the core adjusted to an intermediate position to permit the formation of larger charges. Figures 12 to 15 illustrate an adjustment for producing still larger charges.

Molten glass 20 is supplied from a furnace 21 to a container 22 which may be the usual furnace boot or extension. The container is formed with a well 23, the walls of which comprise vertical portions 24 and tapered walls 25 terminating in an outlet orifice 26 at the bottom of the boot.

A core 27 made of clay or other refractory material, extends vertically downward through the boot concentric with the outlet 26 and is formed with a tapered lower end 28 which may be projected a greater or less extent into or through the outlet to thereby regulate the effective area of the outlet. The core 27 is carried by a metal rod 29 attached to the upper end of the core, said rod having a threaded portion 31 on which is threaded an adjusting gear 32. The core is supported by a yoke 33 mounted on standards 34 extending upward from the frame of the boot. The yoke is adjustable vertically on the standards and held in adjusted position by set screws 35. The core 27 may be adjusted up or down while the feeder is in operation by means of a hand wheel 36 on a rod 37 having a universal joint connection 38 with the shaft of a pinion 39 in mesh with the gear 32.

A regulator 41 in the form of a sleeve or hollow plunger surrounds the core 27 and extends downwardly into the well 23. The lower end of the plunger, as shown, is provided with a concave bottom surface 42, although the shape may be varied. Side openings 43 are provided in the walls of the plunger to permit the entrance of glass. The regulating plunger 41 is carried by a hollow stem 44 mounted to reciprocate vertically in a bearing sleeve 45 formed in a yoke 46 adjustably mounted on the standards 34 and held in adjusted position by set screws 47. The regulator 41 is periodically reciprocated vertically by means of a cam 48 mounted on a shaft 49 driven continuously by a sprocket chain 50 connected to any suitable source of power. The cam operates through a lever 52 having a fulcrum 53 on a stationary bracket 54, the outer end of the lever being bifurcated and connected through links 55 to a supporting ring or yoke 56 surrounding the stem 44. The weight of the plunger is supported on the ring 56, the stem 44 for this purpose being provided at its upper end with flange 57 over said ring. Ball bearings 58 may be provided between the flange 57 and ring 56.

The regulator 41 may be rotated continuously to maintain a proper circulation of the glass entering the well 23, thereby preventing stagnation or one sided chilling of the glass issuing from the outlet and thus avoiding defects in the finished ware which would result from such one sided chilling or lack of homogeneity in the issuing glass. Rotation of the regulator is effected by means of a gear 59 secured to the upper end of the stem 44 and running in mesh with a pinion 61 elongated to provide for the vertical movements of the regulator. The pinion 61 is rotatable on a stem 62 mounted in the yoke 46. A bevel pinion 63 connected to rotate with the pinion 61, meshes with a gear 64 on a shaft 65 having a driving connection through a sprocket chain 66 with the shaft 49. It will be seen that with this construction, the plunger 41 is rotated continuously and vertically reciprocated periodically. The resultant of these combined rotative and vertical movements is a helical or spiral movement as the plunger reciprocates. Knives or shears 67 which may be of any known and approved construction, are operated periodically in synchronism with the movements of the regulator to sever the suspended charges of glass.

The core 27 is adjusted up or down to a position determined by the size and shape of gob or mold charge which it is desired to produce. As shown in Figures 4 to 7 inclusive, the core is adjusted to a position in which the tapered end 28 protrudes downward beyond the outlet, so that the full diameter of the core is at the outlet. In this manner, the effective area of the outlet opening is reduced to a minimum, leaving a very restricted annular passageway or opening between the core and the walls of the outlet, so that a comparatively small amount of glass will issue.

Figure 4 shows the regulator 41 in its uppermost position. As the regulator moves downward, it exerts an expelling force on the glass, causing it to issue or flow through the outlet. The glass as it issues clings to the surface of the core, as indicated in Figure 5, and is thereby prevented from prematurely stringing out or dropping away from the feeder. As the regulator continues to move downward until it reaches the limit of its downward movement, as shown in Figure 6, the glass continues to flow and stretches downward below the point of the core. The plunger 41 now commences its upward movement, as indicated in Figure 7, thereby exerting a retractive pull on the glass at and below the orifice. This in combination with the downward pull by gravity on the suspended gob 68, causes a narrowing or necking-in of the glass at the plane of the shears 67, which now operate to sever the gob.

Figures 8 to 11 show the core adjusted to an intermediate position, providing a much less restricted outlet. The operation in this instance is similar to that described in connection with Figures 4 to 7, except that the glass can flow more freely, resulting in a materially larger charge or gob.

Figures 12 to 15 show the core adjusted to a still higher position in which it does not restrict the outlet to any material extent. A still larger amount of glass will, therefore, be permitted to issue, forming a charge of larger volume than that shown in Figure 11.

It will be understood that as the size of the charge may be varied by adjusting the core up or down without changing the speed of the feeder, the number of charges delivered during a given length of time may likewise be varied while still maintaining the same size of charge by adjusting the core and changing the speed at which the feeder is driven. For example, if it is desired to speed up the glass forming machine to which the charges are delivered, the speed of the feeder which is ordinarily driven by or in synchronism with the forming machine is correspondingly increased. This would result in smaller charges, but by adjusting the core 27 upward, the charges may be maintained at their full normal size required for the molds. Adjustments of the core may also be made while the feeder is in operation to counteract any tendency to variations in size owing to temperature changes or other variations in the condition of the glass.

By reference to Figures 1 and 7, it will be seen that the cutters 67 are located a considerable distance below the outlet 26 so that the cut can take place where the suspended gob is necked in, just below the point of the core. I preferably provide between the cutters and the outlet opening, a cylindrical wall or tube 69 which may be made of fire clay and is removably held in place by clamps 70. This sleeve protects the issuing glass from drafts and provides a heat chamber, which prevents undue chilling of the glass or protruding end 28 of the core. As shown in Figures 8 to 11, a sleeve 69[a] is provided which is shorter than the sleeve 69 to correspond with the higher position of the core 27. In this instance, the shears also are adjusted to a higher plane. In Figures 12 to 15, the sleeve is omitted and the shears cut in a plane a short distance below the outlet. It will be understood that the core 27 may be adjusted through a limited range without making it necessary or desirable to change the sleeve 69 or 69[a].

Modifications may be resorted to within the spirit and scope of my invention.

What I claim is:

1. In a glass feeder, the combination of a container for molten glass having an outlet opening in its bottom, a plug or rod of refractory material projecting downward through the glass over the outlet, the lower end of said plug being tapered and protruding through the outlet, and means providing a heated chamber enclosing said protruding end.

2. In a glass feeder, the combination of a container for molten glass having an outlet opening in its bottom, a plug or rod of refractory material projecting downward through the glass over the outlet, the lower end of said plug being tapered and protruding through the outlet, means providing a heated chamber enclosing said protruding end, and means for adjusting the plug up and down.

3. In a glass feeder, the combination of a container for molten glass having an outlet opening in its bottom, a plug or rod of refractory material projecting downward through the glass over the outlet, the lower end of said plug being tapered and protruding through the outlet, means providing a heated chamber enclosing said protruding end, a regulator within the container, means to periodically reciprocate said regulator, and a cutter beneath said chamber for severing charges of glass suspended from said plug.

4. In a glass feeder, the combination of a container for molten glass provided with an outlet opening in its bottom, a core projecting downward into the glass over the outlet, a regulator cooperating with the core and operating periodically to control the discharge of glass through the outlet and thereby produce suspended charges of molten glass, means for adjusting the core up and down, the core being shaped to vary the effective area of the outlet when so adjusted, and means to rotate said regulator about the axis of the outlet.

5. A glass feeder comprising in combination a container for molten glass having an outlet opening through which the glass issues, a hollow regulating plunger, means to reciprocate the plunger toward and from the outlet, a stationary core within the plunger, and automatic means to continuously rotate the plunger.

6. In a glass feeder, the combination of a container for molten glass formed with a well in the floor thereof having an outlet opening in its bottom, a core projecting downward through the well and having its lower end tapered and projecting through the outlet, means to adjust the core up and down, a hollow plunger surrounding the core and projecting downward into the well, mechanism for periodically reciprocating the plunger vertically, and mechanism for rotating the plunger about the axis of the core.

7. In a glass feeder, the combination of a container for molten glass having an outlet opening in its bottom, a core in the glass over the outlet, a regulator, and means to move the regulator spirally toward and from the outlet.

8. In a glass feeder, the combination of a container for molten glass having an outlet opening in its bottom, a core extending downward in the glass over the outlet concentric therewith, a regulator, and means to move the regulator spirally about the axis of the core toward and from the outlet.

9 In a glass feeder, the combination of a container for molten glass having an outlet opening in its bottom, a core in the glass over the outlet, a hollow regulating plunger surrounding said core, and automatic means to periodically move the plunger spirally toward and from the outlet.

10. In a glass feeder, the combination of a container for molten glass having an outlet opening in its bottom, means to periodically exert an expelling force on the glass in the container, means beneath said outlet forming a support from which the glass is suspended as it issues, and means to sever the suspended glass.

11. In a glass feeder, the combination of a container for molten glass having an outlet opening in its bottom, means to periodically exert an expelling force on the glass in the container, and a core projecting downward through the outlet opening and forming a support from which the glass is suspended as it issues.

12. The combination of a container for molten glass provided with an outlet opening in its bottom, a core projecting downwardly through the opening and providing a support from which the issuing glass is suspended, a regulator, and means to periodically reciprocate the regulator toward and from the outlet and thereby control the discharge of glass.

13. The combination of a container for molten glass provided with an outlet opening in its bottom, a core projecting downwardly through the opening and providing a support from which the issuing glass is suspended, a regulator, means to periodically reciprocate the regulator toward and from the outlet and thereby control the discharge of glass, and means to adjust said core upwardly to a position in which the suspension of the glass is transferred to the walls of the outlet.

14. A glass feeder comprising, in combination, a container for molten glass having a bottom outlet opening, a hollow plunger, automatic means to periodically reciprocate the plunger toward and from the outlet, automatic means to rotate the plunger, and a stationary core within the plunger.

15. A glass feeder comprising, in combination, a container for molten glass having a bottom outlet opening, a hollow plunger, automatic means to periodically reciprocate the plunger toward and from the outlet, automatic means to rotate the plunger, a device for controlling the effective size of the outlet, and adjusting means located above and having operating connection through the hollow plunger with said device for adjusting its position and thereby regulating the effective size of the outlet.

16. A glass feeder comprising, in combination, a container for molten glass having a bottom outlet opening, a hollow plunger, automatic means to periodically reciprocate the plunger toward and from the outlet, automatic means to rotate the plunger, and a stationary core within the plunger, said plunger being formed with a submerged inlet in the side wall thereof through which the glass may enter the plunger.

17. Glass feeding mechanism comprising, in combination, a container for molten glass having an outlet opening, a hollow plunger, automatic means to reciprocate and rotate the plunger, and a stationary core within the plunger.

18. Glass feeding mechanism comprising, in combination, a container for molten glass having an outlet opening, a hollow plunger, automatic means to reciprocate and rotate the plunger, and a non-rotating core extending downward through the plunger into the outlet opening.

19. In a glass feeding apparatus, the combination of a container for molten glass having a downwardly directed discharge outlet, a hollow plunger extending into the glass above the outlet, automatic means to periodically reciprocate the plunger, a stationary core within the plunger, the plunger being formed to permit an inflow of glass at one side of the plunger axis, and means cooperating with the plunger to cause the point of inflow to revolve about the axis of the plunger.

20. In a glass feeding apparatus, the combination of a container for molten glass having a downwardly directed discharge outlet, a hollow plunger extending into the glass above the outlet, automatic means to periodically reciprocate the plunger, a stationary core within the plunger, the plunger being provided with a side opening through which the glass enters, and means to cause said opening to revolve about the axis of the plunger.

21. In a glass feeder, the combination of a container for molten glass having an outlet opening through which the glass issues, a hollow regulating plunger, means to reciprocate the plunger toward and from the outlet, a stationary core within the plunger, the plunger having a concave bottom face surrounding the core, and automatic means to rotate the plunger.

22. In glass feeding mechanism, the combination of a container for molten glass having a discharge outlet in the bottom thereof through which the glass issues, a stationary supporting device projecting downward through the glass in the container and protruding through and below the outlet, an implement extending into the glass adjacent said supporting device and operating periodically to control the flow of glass through the outlet, and means to sever the glass below said supporting device.

23. In glass feeding apparatus, the combination of a container for molten glass having a bottom outlet opening, a core extending downward through the glass and protruding through and below said opening and forming with said opening an annular passageway through which glass is discharged, an implement surrounding said core adjacent the outlet and periodically moving toward and from the outlet, and means for periodically severing the discharged glass.

24. In glass feeding apparatus, the combination of a container for molten glass having a bottom outlet opening, a core extending downward through the glass and protruding through and below said opening and forming with said opening an annular passageway, mechanical means providing an expelling surface surrounding the core and periodically movable in a direction for periodically applying an expelling force to the glass and causing it to issue through said passageway and hang as a suspended mass from said core, and means for severing the suspended glass.

25. Glass feeding apparatus comprising a container for molten glass formed with a bottom outlet opening, a core projecting downward through the glass in the container and protruding through the outlet, and means for causing a rotary circulation of glass within the container around the axis of the outlet.

26. Glass feeding apparatus comprising a container for molten glass formed with a bottom outlet opening, a core projecting downward through the glass in the container and protruding through the outlet, means for causing a rotary circulation of glass within the container around the axis of the outlet, comprising a rotary hollow plunger surrounding the core, and means for periodically reciprocating the plunger toward and from the outlet.

Signed at Toledo, in the County of Lucas and State of Ohio, this 26th day of December, 1923.

LEONARD D. SOUBIER.